US008439395B2

(12) United States Patent
Nagai et al.

(10) Patent No.: US 8,439,395 B2
(45) Date of Patent: May 14, 2013

(54) AIR BAG AND AIR BAG DEVICE

(75) Inventors: Makoto Nagai, Saitama (JP); Akihiro Barasawa, Shizuoka-ken (JP); Ryuji Sagisaka, Shizuoka-ken (JP)

(73) Assignees: Honda Motor Co., Ltd., Tokyo (JP); Nihon Plast Co., Ltd., Shizuoka-Ken (JP)

( * ) Notice: Subject to any disclaimer, the term of this patent is extended or adjusted under 35 U.S.C. 154(b) by 286 days.

(21) Appl. No.: 12/691,025

(22) Filed: Jan. 21, 2010

(65) Prior Publication Data
US 2010/0213692 A1 Aug. 26, 2010

(30) Foreign Application Priority Data
Feb. 26, 2009 (JP) ................................. 2009-044117

(51) Int. Cl.
*B60R 21/233* (2006.01)
(52) U.S. Cl.
USPC ....................................... 280/729; 280/743.1
(58) Field of Classification Search .................. 280/729, 280/743.1
See application file for complete search history.

(56) References Cited

U.S. PATENT DOCUMENTS

| 3,586,347 | A | * | 6/1971 | Carey et al. | 280/729 |
|---|---|---|---|---|---|
| 3,638,755 | A | * | 2/1972 | Sack | 181/296 |
| 3,900,210 | A | * | 8/1975 | Lohr et al. | 280/729 |
| 6,086,092 | A | * | 7/2000 | Hill | 280/729 |
| 7,673,899 | B2 | * | 3/2010 | Abe | 280/742 |
| 7,992,897 | B2 | * | 8/2011 | Sekino et al. | 280/739 |
| 8,109,534 | B2 | * | 2/2012 | Schindzielorz et al. | 280/743.1 |
| 2001/0015545 | A1 | * | 8/2001 | Igawa et al. | 280/728.2 |
| 2002/0020990 | A1 | * | 2/2002 | Sinnhuber et al. | 280/729 |
| 2006/0186647 | A1 | * | 8/2006 | Bosch | 280/729 |
| 2006/0197320 | A1 | * | 9/2006 | Abe | 280/729 |
| 2006/0237953 | A1 | * | 10/2006 | Abe | 280/729 |
| 2007/0045997 | A1 | * | 3/2007 | Abe et al. | 280/729 |
| 2007/0205590 | A1 | * | 9/2007 | Klinkenberger et al. | 280/743.2 |
| 2007/0290489 | A1 | * | 12/2007 | Aranzulla et al. | 280/732 |
| 2009/0206582 | A1 | * | 8/2009 | Kumagai et al. | 280/729 |
| 2011/0018244 | A1 | * | 1/2011 | Schindzielorz et al. | 280/743.1 |

FOREIGN PATENT DOCUMENTS

| JP | 11321506 A | 11/1999 |
|---|---|---|
| JP | 2006224748 A | 8/2006 |

* cited by examiner

*Primary Examiner* — Nicole Verley
(74) *Attorney, Agent, or Firm* — Arent Fox LLP

(57) ABSTRACT

An airbag and an airbag device, which are capable of readily improving expansion characteristics of the airbag and reducing manufacturing cost, are provided. An airbag 11 for occupant at passenger's seat includes a first bag 21 and a second bag 22 which is provided inside of the first bag 21. An outside top face portion 36 of the first bag 21 and an inside top face portion 46 of the second bag 22 are brought into a sheet-like intimate contact with each other, and are detachably jointed at the jointing portion 51. The jointing portion 51 is comprised of a breakable seam line 52. Gas is supplied into the second bag 22 to thereby expand the first bag 21, and is supplied into the first bag 21 via a gas distributing portion 48 to thereby expand the first bag 21. In a case where an occupant exists at a predetermined position, the jointing portion 51 breaks away, and the first bag 21 then expands to its maximum. In an OOP state in which the occupant exists in the proximity of the airbag device 1, a head part of the occupant holds the outside top face portion 36 and disallows breakage of the jointing portion 51, so that expansion of the first bag 21 to the occupant side can be restrained and the occupant can be protected with an appropriate force.

2 Claims, 4 Drawing Sheets

AIR BAG AND AIR BAG DEVICE

CROSS REFERENCE TO RELATED APPLICATIONS

This application claims priority of Japanese Patent Application No. 2009-044117 filed on Feb. 26, 2009. The contents of this application are incorporated herein by reference in their entirety.

BACKGROUND OF THE INVENTION

1. Field of the Invention

The present invention relates to an airbag and an airbag device for occupant at passenger's seat, which are included in an instrument panel of a vehicle, for example.

2. Description of the Related Art

Conventionally, an airbag device for occupant at passenger's seat is employed for protecting an occupant at passenger's seat of a vehicle. This airbag device is included in an instrument panel which is opposed to the occupant at the passenger's seat, and is provided with constituent elements such as: a case member substantially shaped like a case; an airbag substantially shaped like a bag, which is retracted and accommodated in this case member; an inflator which is mounted on the case member, for supplying gas to the airbag; and a cover member for covering the retracted airbag. In addition, in a state in which a control unit detects collision of a vehicle, this airbag device allows the inflator to be activated to supply gas inside of the airbag; and the cover member to be pushed and opened to inflate and expand the airbag forward of the occupant having taken the passenger's seat, thereby protecting the occupant while mitigating the shock delivered thereto.

As to such airbag device, a variety of constructions are proposed allowing the device to appropriately protect the occupant, even in a so called OOP state in which the airbag inflates and expands with the occupant being close to the airbag device; and for example, a construction employing an output variable type inflator is known (refer to Japanese Laid-open Patent Application No. 11-321506, for example). Further, in this construction, an outer bag and an inner bag are provided to duplex the airbag, and a portion at which the outer bag is folded and a portion at which the inner bag is folded are sewn and jointed with each other by means of a severable tear seam. In this construction, in a case where the inflator is activated at a low output, the tear seam is not severed, and the airbag slightly inflates. Alternatively, in a case where the inflator is activated at a large output, the tear seam is severed, and the airbag significantly inflates, allowing expansion characteristics of the airbag to vary depending upon the occupant, attempting to improve performance of protecting the occupant.

However, in the construction of Japanese Laid-open Patent Application No. 11-321506, the output variable type inflator is required, and the portions at which the outer and inner bags are folded respectively are needed to be sewn and jointed with each other. Therefore, a manufacturing process becomes complicated, and reduction of manufacturing cost is not easy.

In addition, as to such airbag device, there is known a construction in which: ground cloths constituting the airbag are sewn and jointed with each other at a breakable jointing portion; vent holes formed on the ground cloths are covered with a vent hole cover; ends of the vent hole cover are jointed with the ground cloths at the jointing portion; and a separation portion, which is expandable or breakable if a predetermined load or more is applied, is provided on the vent hole cover (refer to Japanese Laid-open Patent Application No. 2006-224748, for example).

However, in the construction of Japanese Laid-open Patent Application No. 2006-224748 as well, there is a need to include a vent hole cover on which a separation portion, which is expandable or breakable if a predetermined load or more is applied, is provided; a structure becomes complicated; and reduction of manufacturing cost is not easy.

SUMMARY OF THE INVENTION

As described above, the conventional construction entails the problem that its structure becomes complicated and reduction of manufacturing cost is not easy.

The present invention has been made in view of the above-described circumstance, and aims to provide an airbag and an airbag device which allow manufacturing cost to be reduced while improving expansion characteristics thereof.

According to a first aspect of the present invention, there is provided an airbag inflating and expanding toward a target for protection, when gas is introduced in a retracted and accommodated state, the airbag including:

a first bag substantially shaped like a bag, in which a sheet-like outside top face portion opposed to the target for projection is provided while the first bag inflates and expands;

an inside top portion which is disposed inside of the first bag and opposed to the outside top face portion;

a gas introducing portion from which gas is to be introduced;

a second bag substantially shaped like a bag, which is positioned between the inside top face portion and the gas introducing portion, in which a gas distributing portion at which gas is distributable is provided, and which is independent of the first bag; and a jointing portion for detachably jointing the outside top face portion and the inside top face portion with each other, with the outside top face portion and the inside top face portion being superimposed in a sheet-like intimate contact with each other.

According to a second aspect of the present invention, there is provided an airbag device for occupant at passenger's seat, which is disposed in an instrument panel portion of a vehicle in opposite to an occupant at passenger's seat, the airbag device including:

the airbag according to the first aspect, opening toward a vehicle widthwise direction at the gas distributing portion and inflating and expanding with the outside top face portion being opposed to the occupant as a target to be protected; and an inflator for supplying gas to the gas introducing portion of the airbag.

According to the airbag of the first aspect, when gas is introduced into a gas introducing portion in a retracted and accommodated state, a second bag inflates and expands and a first bag inflates and expands with gas being supplied from the second bag thereto via the gas distributing portion. In a process in which the airbag inflates and expands, an outside top face portion and an inside top face portion, jointed with each other by means of a jointing portion, expand integrally toward a target to be protected in a sheet-like manner. In addition, in the process in which the airbag inflates and expands, in a case where the target to be protected is spaced from a sheet-like jointed portion, the jointing portion breaks away owing to a pressure of the gas supplied into the first bag, i.e., between the first bag and the second bag. Afterwards, the outside top face portion and the inside top face portion are separated from each other; the first bag further inflates and expands so as to allow the outside top face portion to be proximal to the target to be protected, enabling the airbag to appropriately protect the target to be protected. On the other hand, while the target to be protected is in abutment against the sheet-like jointed portion by the jointing portion, it is compressed in a direction in which the outside and inside top face portions are brought into intimate contact with each other; the jointing portion is reinforced; and breakage of the jointing portion is disallowed or restrained. In this state, the outside and inside top face portions are not separated from each other, and movement of the first bag toward the target to be protected, of the outside top face portion is restrained, enabling the airbag to appropriately the target to be protected. As to the airbag device having this airbag, there is no need to employ an inflator such as an output variable type inflator; the structure of the airbag is the one simplified with its duplexed bags; and the jointing portion allows the two faces to be superimposed in intimate contact with each other. Therefore, there is no need for a complicated manufacturing process such as jointing folded portions with each other; the structure and manufacturing process are simplified, and manufacturing cost can be reduced.

According to the airbag device of the second aspect, the airbag of the first aspect is provided; the first bag inflates and expands significantly to protect an occupant seated at a predetermined position, restraining movement of the first bag to the occupant side at the outside top face portion to be restrained for the occupant proximal to the airbag device; allowing the first bag to be prone to inflate and expand in the vehicle widthwise direction by means of a gas distributing portion opening toward the vehicle widthwise direction; and enabling the airbag device to appropriately protect the target to be protected.

DESCRIPTION OF THE PREFERRED EMBODIMENTS

Figure 1:
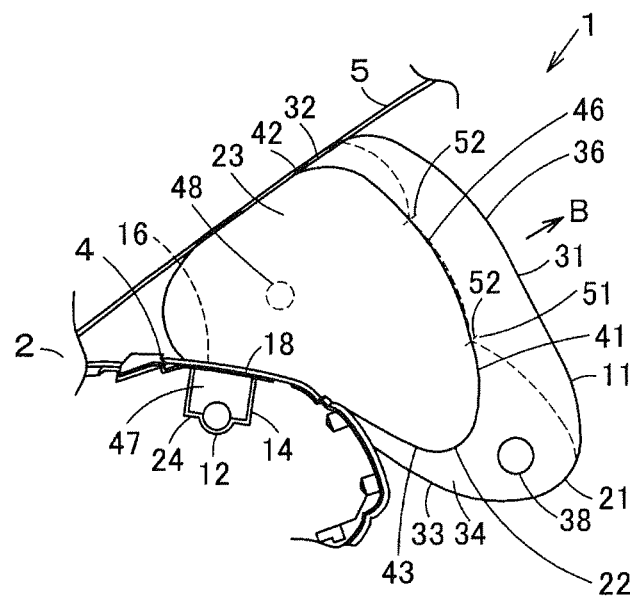
FIG. 1 is an explanatory view of an expanded state of an airbag, showing one embodiment of an airbag and an airbag device, according to the present invention.
Figure 2:
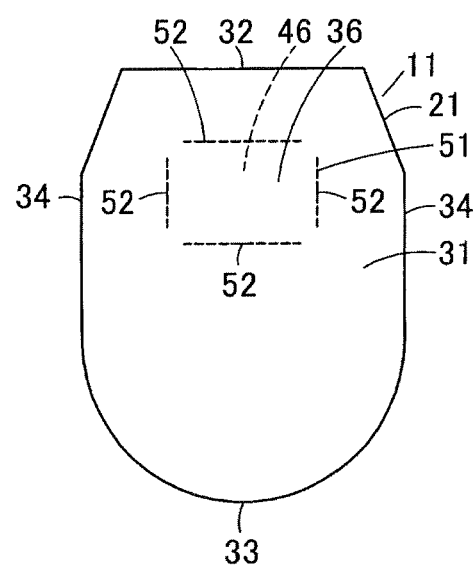
FIG. 2 is a front view of the expanded state of the airbag.

Hereinafter, one embodiment of an airbag and an airbag device, according to the present invention, will be described referring to the drawings.

Figure 3:
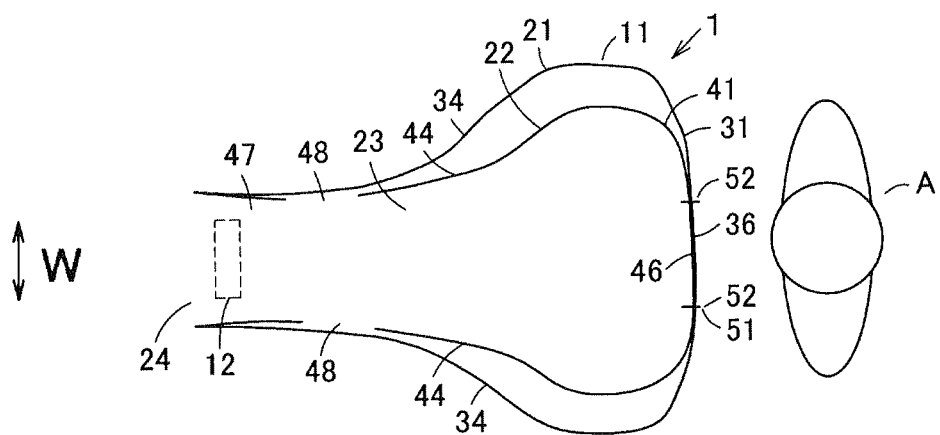
FIG. 3 is an explanatory view showing an expansion process of the airbag.
Figure 5:
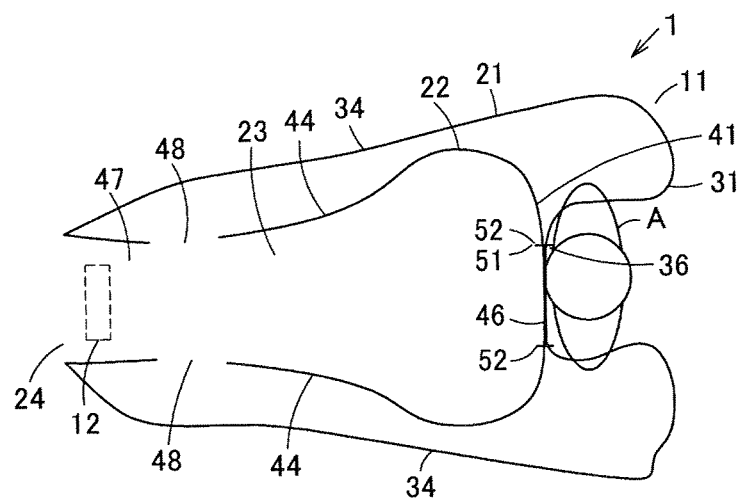
FIG. 5 is an explanatory view showing another expansion process which follows that of the airbag shown in FIG. 3.

In FIGS. 1, 3, and 5, reference numeral 1 designates an airbag device. This airbag device 1 is disposed at a passenger's seat of an automobile 2 as a vehicle which is a movable body, i.e., inside of an instrument panel portion 4 as an installation portion positioned in front of an occupant A at the passenger's seat, which is a target to be protected; and constitutes an airbag device 1 for occupant at passenger's seat. In the following description, a longitudinal direction, a transverse direction, and a vertical direction are explained with reference to an automobile cruising direction with the airbag device 1 being mounted on the automobile, and the transverse direction corresponds to a vehicle widthwise direction (W direction indicated by the arrow shown in FIG. 3). The instrument panel portion 4 is formed at a site shaped like a curved face declining towards a rear side, i.e., the passenger's seat side, and the airbag device 1 is securely fixed with screws or the like at a steering member, although not shown, as a mounted member which is disposed inside of the instrument panel portion 4. In addition, a front glass 5, which is a window shield inclined from a downward foreside toward a rearward upside, is disposed upward of the instrument panel portion 4.

The airbag device 1 includes: an airbag 11 substantially shaped like a bag, which is constituted on a ground cloth; an inflator 12 for supplying gas to the airbag 11; a case member 14 on which these airbag 11 and inflator 12 or the like are to be mounted; and a cover member 16 for covering the airbag 11 before expanded.

The case member 14 is substantially shaped like a case; a rectangular protrusive opening 18 that is an opening is provided upside of the case member; and an airbag accommodation portion for accommodating the retracted airbag 11 is provided inside thereof. This protrusive opening 18 is usually covered with the cover member 16. The cover member 16 is formed of a resin to be integrated with or separated from the instrument panel portion 4. Further, a tear line, which is thinner than and easily breakable from another portion, is formed in a planar, substantial H-letter shape.

The inflator 12 is shaped like a cylinder or a disk, and a gas injection orifice is provided for the sake of injecting gas. In addition, the inflator 12 is mounted on the case member 14 together with the airbag 11 while all or part of the inflator 12, i.e., at least a portion at which the gas injection orifice is provided, is disposed inside of the airbag 11.

The airbag 11, as shown in FIGS. 1 to 5, includes a first bag 21 and a second bag 22 which is disposed inside of the first bag 21; and a so called inflation portion 23, which inflates and expands after gas is introduced, is partitioned internally or externally by means of the second bag 22, the entirety of which is duplexed, i.e., multiplexed.

The first bag 21 is formed in a three-dimensional baggy shape on a ground cloth, and may be referred to as a main bag or an outer bag constituting an outer shell of the airbag 11. This bag includes: a substantially flat, outer front face portion 31, facing from a proximal end part 24 which is fixed to the case member 14 toward an occupant A, i.e., toward a front face side B; an outer top face portion 32, extending from the proximal end part 24 to an upper edge part of the outer front face portion 31; an outer bottom face portion 33, extending from the proximal end part 24 to a lower edge part of the outer front face portion 31; and a pair of both outside face portions 34, covering side parts of a portion which is surrounded by the outer front face portion 31, the outer top face portion 32, and the outer bottom face portion 33. A sewn portion (outer periphery sewn), at which ground cloths are sewn with textile thread(s) and are jointed with each other, is set along all or part of the outer periphery of the outer front face portion 31, for example, along bilateral parts and a lower part. This sewn portion is also set so that the outer front face portion 31 is substantially planar at the time of inflation and expansion of the airbag 11. In addition, an outside top face portion 36 having a predetermined square area, i.e., predetermined length dimensions in a vertical direction and a vehicle widthwise direction, is set at a portion which is opposed to a head part of the occupant A at the upper part of the outer front face portion 31. Further, a vent hole 38, which is an exhaust vent shaped like a circular hole, is provided in the proximity of corners between the outer front face portion 31 and the outer bottom face portion 33 of the outside face portion 34, which is in the proximity of an end part at the downstream side of the first bag 21.

On the other hand, a second bag 22 is interpolated inside of the first bag 21 or may be referred to as an inner bag or an inside bag. This bag is independent of the first bag 21; is smaller in capacity than, and is substantially similar in shape to, the first bag 21; and is formed in a three-dimensional baggy shape with ground cloths. In other words, the second bag 22 includes: a substantially planar, inner front face portion 41, facing the proximal end part 24 which is fixed to the case member 14 toward the occupant A, i.e., toward the front face side B; an inner top face portion 42, extending from the proximal end part 24 to an upper edge part of the inner front face portion 41; an inner bottom face portion 43, extending from the proximal end part 24 to an lower edge part of the inner front face portion 41; and a pair of bilateral inside face portions 44, covering side parts of a portion which is surrounded by the inner front face portion 41, the inner top face portion 42, and the inner bottom face portion 43. In addition, a sewn portion, at which ground cloths are sewn with textile thread(s) and are jointed with each other, is set along all or part of the outer periphery of the inner front face portion 41, for example, along bilateral parts and a lower part. This sewn portion is also set so that the inner front face portion 41 is substantially planar at the time of inflation and expansion of the airbag 11. In addition, an inside top face portion 46 having a predetermined square area, i.e., predetermined length dimensions in a vertical direction and a vehicle widthwise direction W, is set at a portion which is opposed to a head part of the occupant A at the upside part of the inner front face portion 41, i.e., at a portion which is opposed to the outside top face portion 36. Further, a gas introducing portion 47, to which gas is to be supplied from the inflator 12, is provided at the proximal end part of the second bag 22, and is positioned between the gas introducing portion 47 and the inside top face portion 46. At the inside top face portion 44, a gas distributing portion 48 which is an exhaust opening shaped like a circular hole is provided, allowing an inside of the second bag 22 and an inside of the first bag 21 to communicate with each other.

Further, at this airbag 11, a jointing portion 51 is formed for detachably jointing the outside top face portion 36 and the inside top face portion 46 with each other, with the outside top face portion 36 and the inside top face portion 46 being superimposed in planar intimate contact with each other, at least in a state before inflation and expansion. In the embodiment, the jointing portion 51 is a so called tear seam portion (tear seam sewing), at which ground cloths constituting the first and second bags 21 and 22 are sewn with textile thread(s) and are jointed with each other. More specifically, this jointing portion is comprised of four linear seam lines 52 which are continuous to each other along four sides of a square-shaped region. The seam lines 52 of the jointing portion 51, unlike the specification of other sewn portions such as outer periphery sewn, are intentionally set so as to break owing to breakage of the textile thread(s) if a predetermined force is applied.

Although not shown, as to the ground cloths constituting the airbag 11, those called reinforce cloths or anti-flaming cloths are sewed and jointed with each other in a superimposed manner, as required, attempting to improve mechanical and thermal strengths. In addition, a sheet which is a lapping member retaining the shape of the retracted airbag 11 and breaking at the time of expansion of the airbag 11 is further sewn and jointed in a superimposed manner, and the three-dimensional airbag 11 is constituted.

The constituted airbag 11 is retracted in a predetermined shape, and the predetermined shape is retained by means of the sheet or the like. Afterwards, the retracted airbag 11 is accommodated in an airbag accommodation portion of the case member 14; a gas injection orifice of the inflator 12 is disposed at the gas introducing portion 47 with the use of fittings such as a retainer plate, although not shown; and a peripheral portion of the gas introducing portion 47 of the airbag 11 and the inflator 12 are fixed at a bottom part of the casing member 14, constituting the airbag device 1.

The airbag device 11 is mounted on the instrument panel portion 4 of the automobile 2, and is electrically connected to a control unit equipped with a sensor or the like, although not shown.

The constituted airbag device 1 allows the control unit to actuate the inflator 12 and allows gas to be injected from the inflator 12 in the event of an accident such as collision of the automobile 2. The airbag 11 then inflates and expands with inflow of the gas; breaks the tear line of the cover member 16 and protrudes from a protrusive opening; inflates and expands toward the front face side B along a front glass 5 or directly; expands to allow the outer front face portion 31 to be opposed forward of an upper body of the occupant A having taken the passenger's seat; and constrains the occupant A, thereby protecting the occupant from a shock of the collision.

Next, an expansion process of the airbag 11 will be described in more detail.

Figure 4:
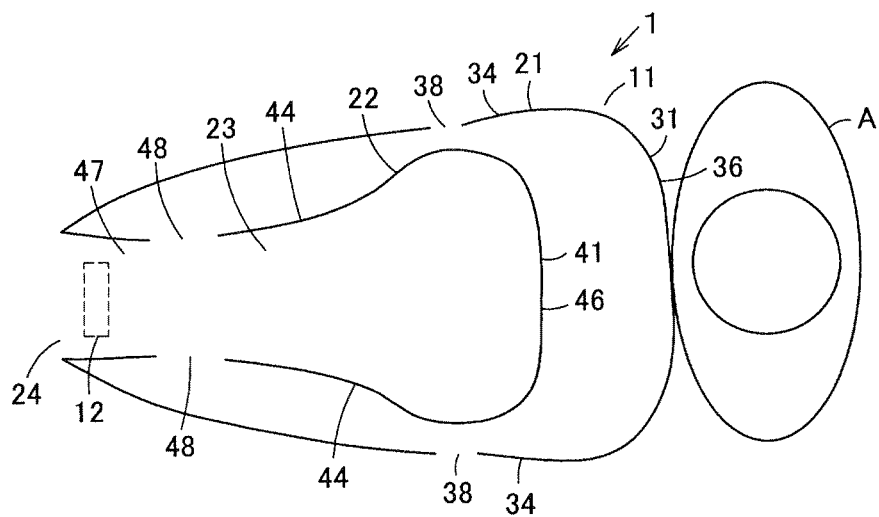
FIG. 4 is an explanatory view showing an expansion process which follows that of the airbag shown in FIG. 3.

First, the gas supplied from the inflator 12, as shown in FIG. 3, is supplied from the gas introducing portion 47 into the second bag 22, allowing the second bag 22 to directly inflate and expand, and is supplied into the first bag 21 via the gas distributing portion 48, allowing the first bag 21 to, in a sense, indirectly inflate and expand. In a case where the occupant A exists at a predetermined (normal) position, i.e., in a case where the occupant takes the passenger's seat and wears a seatbelt, the second bag 22 inflates and expands to its maximum, in which state the inner front face portion 41 which is a tip end part at the front side of the second bag 22, i.e., the outside top face portion 36 jointed with the inside top face portion 46 at the jointing portion 51, is spaced from the head part of the occupant A. Afterwards, if gas is further supplied, the gas allows the first bag 21 to inflate and expand; and the joining portion 51, i.e., the seam line 52 sequentially breaks away owing to a pressure or tensile stress exerted when the first bag 21 inflates and expands. Further, as indicated by the solid line of FIG. 1 and as shown in FIG. 4, the first airbag 21 is allowed to gradually expand to its maximum in accordance with breakage taken along the longitudinal direction of the jointing portion 51, i.e., the seam line 52, in front of the occupant A, thereby protecting the occupant A. In FIG. 4, the occupant A is shown as a dummy simulating an average male American adult, and it is also shown to allow the above airbag to sufficiently receive and protect this adult, i.e., the occupant A, with an appropriate constraint force.

On the other hand, in a so called OOP state in which the occupant A exists at a position other than the predetermined position, which is proximal to the airbag device 1, in the state shown in FIG. 3, the head part of the occupant A is in abutment against the inner front face portion 41 which is the tip end part of the front side of the second bag 22, i.e., against the outside top face portion 36 jointed with the inside top face portion 46 at the jointing portion 51, and the outside top face portion 36 is compressed in a sheet-like shape. A force transmitted from the head part of the occupant A reinforces the jointing portion 51, disallowing or restraining breakage of the jointing portion 51 Further, gas is supplied to the first bag 21 toward a direction taken along the vehicle widthwise direction W crossing a front side from the gas distributing portion 48, and a force is not directly applied in the direction of breaking the jointing portion 51. Therefore, as indicated by the double-dotted chain line of FIG. 1 and as shown in FIG. 5, the first bag 21 inflates and expands so as to mitigate its inflation and expansion to the front side. Namely, the inflation and expansion of the first bag 21 to the front side, i.e., the occupant side, is restrained, allowing the occupant A to be protected with an appropriate force. In FIG. 5, the occupant A is shown as a dummy simulating an infant, and it is shown that an occupant A of small stature in the so called OOP state can be protected with an appropriate constraint force.

In addition, the gas allowed to expand the first and second bags 21 and 22 is evacuated outside of the airbag 11 from the vent hole 38 toward both sides.

As described above, in the embodiment, as to the airbag device 1 for occupant at passenger's seat, the airbag 11 has a multiplexed structure in which: the second bag 22 is interpolated inside of the first bag 21; the outside top face portion 36 of the first bag 21 is superimposed on the inside top face portion 46 of the second bag 22, and are detachably jointed with each other at the jointing portion 51 with these portions being superimposed in a sheet-like intimate contact; and the gas distributing portion 48 is provided to be positioned between the gas introducing portion 47 and the jointing portion 51. Therefore, the occupant A at a predetermined position can be constrained and protected with a sufficient resistive force by means of the first and second bags 21, 22 having expanded to their maximum, respectively, and the outside top face portion 36 of the first bag 21 can be moved toward the occupant A at a stepwise appropriate velocity with breakage of the jointing portion 51. In the so called OOP state in which the occupant A exists at a position other than the predetermined position, which is proximal to the airbag device 1, the breakage of the jointing portion 51 is disallowed or restrained by the occupant A oneself, restraining inflation and expansion of the first bag 21 to the front side, i.e., to the occupant side, and allowing the occupant A to be protected with an appropriate force while reducing a pressure applied to the head part of the occupant A. Accordingly, the airbag 11 employed in the airbag device 1 for occupant at passenger's seat can readily achieve its preferred characteristics.

In addition, the gas distributing portion 48, which is provided at the second bag 22, opens toward the vehicle widthwise direction W, thus allowing the airbag 11 to be prone to inflate more laterally broadly than on the front side. The airbag 11 employed in the airbag device 1 for occupant at passenger's seat can readily achieve its preferred characteristics that a force applied to the occupant A can be readily reduced in the so called OOP state.

As described above, in the embodiment, a timing of breakage of the jointing portion 51 and an internal pressure of the airbag 11 are controlled according to the sewed shape of the seam line 52, so that: the occupant A can be protected with an appropriate constraint force according to a state of receiving the airbag 11; and two expansion modes, i.e., OOP and normal modes can be realized.

A structure of the airbag 11 is so simple that: a bag is duplexed; the jointing portion 51 and the gas distributing portion 48 are provided; and the jointing portion 51 allows its faces to be superimposed and to be detachably in contact with each other. Thus, there is no need for a complicated manufacturing process such as jointing folded portions, and the airbag device 1 needs neither to employ an output variable type inflator or a plurality of inflators nor to perform complicated control operation such as delaying an expansion time, allowing its structure and manufacturing process to be simplified and manufacturing cost to be readily reduced.

While, in the above-described embodiment, the jointing portion 51 was comprised of four straight seam lines 52 which are independent of each other, the present invention is not limitative thereto. The outside top face portion 36 of the first bag 21 and the inside top face portion 46 of the second bag 22 are jointed by sewing them so as to constitute a region of a predetermined square area, and the shape of the jointing portion 51 is varied, thereby varying gas flow so that: the protrusion quantity, protrusion shape or timing of the airbag 11 can be readily controlled; and manufacturing cost can be reduced in comparison with the construction employing the output variable type inflator or the like.

Figure 6:
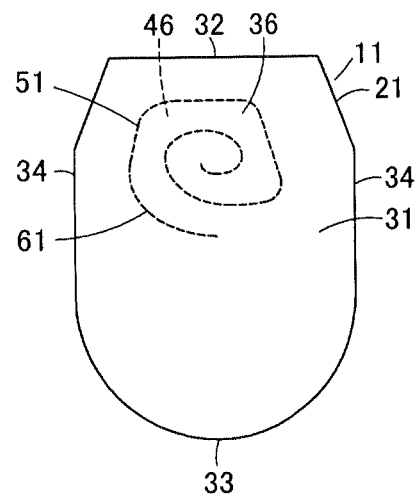
FIG. 6 is a front view of an expanded state showing another embodiment of the present invention.

The shape of the jointing portion 51, for example, as shown in FIG. 6, is formed by one spiral (swirling) seam line 61, and this long seam line 61 sequentially breaks away in the longitudinal direction, thereby achieving characteristics of allowing the outside top face portion 36 to move slowly.

Figure 7:
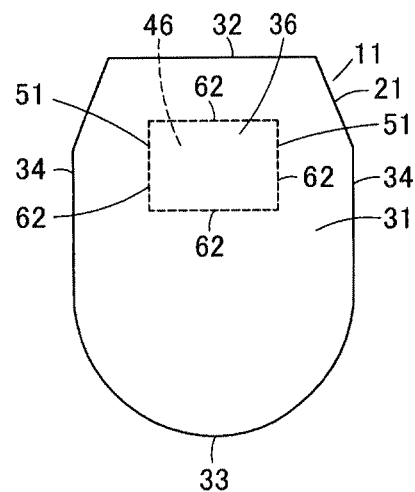
FIG. 7 is a front view of an expanded state showing still another embodiment of the present invention.

In addition, as shown in FIG. 7, for example, a plurality of seam lines 62 are allowed to be continuous to each other at their corners, and the shape of a square, for example, is formed thereby allowing a force required to start breakage to increase in comparison with the construction employing the seam lines 52 that are independent of each other.

Figure 8:
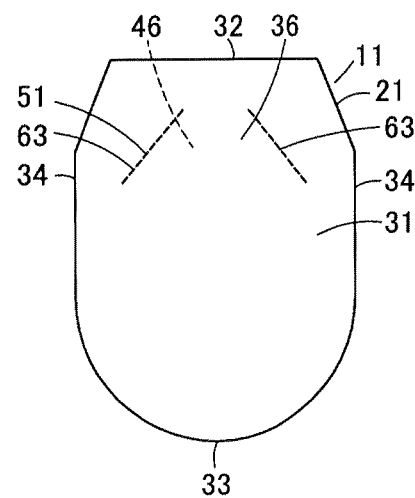
FIG. 8 is a front view of an expanded state showing yet another embodiment of the present invention.

Further, the number of seam lines constituting the jointing portion 51 is not limitative to four lines, and as shown in FIG. 8, for example, two seam lines 63 are allowed to be disposed in an inverted V-shape continuously or independently.

Furthermore, the seam lines constituting the jointing portion 51 are allowed to be a plurality of curves or a combination of curves and straight lines.

Still furthermore, the jointing portion 51 may be formed by jointing the outer front face portion 31 and the inner front face portion 41 with each other, around a portion which is opposed to the head part of the occupant A as well as the portion which is opposed to the head part of the occupant A, or alternatively, the outside face portion 34 and the inside face portion 44 are jointed with each other, and further, the jointing portion 51 is provided all over the faces of the first and second bags 21 and 22 as well, whereby shape control or internal pressure control can be effectively performed.

Yet furthermore, the airbag device 1 is not limitative to the airbag device 1 for occupant at passenger's seat, which is included in the instrument panel portion 4 of the vehicle 2, and is applicable to an airbag device or the like, including an airbag expanding from a rear part of a front seat of the vehicle 2 toward the upper body of the occupant A at the rear seat, for example.

The present invention is applicable to an airbag and an airbag device for occupant at passenger's seat, which are included in an instrument panel of a vehicle, for example.

What is claimed is:

1. An airbag inflating and expanding toward a target to be protected, when gas is introduced in a retracted and accommodated state, said airbag comprising:
    a first bag substantially shaped like a bag in which an outside top face portion opposed to the target to be protected is provided while the first bag inflates and expands;
    a gas introducing portion from which gas is to be introduced;
    a second bag substantially shaped like a bag which extends and is defined between an inside top portion and the gas introducing portion, and having an inside top face portion which is disposed inside of the first bag and opposed to the outside top face portion, and a gas distributing portion at which gas is distributable, the second bag being independent of the first bag; and a jointing portion detachably jointing parts of the outside top face portion of the first bag and the inside top face portion of the second bag with each other on the airbag front face that is opposed to the target to be protected, with the outside top face portion of the first bag and the inside top face portion of the second bag being superimposed in a sheet-like intimate contact with each other in a manner that all the jointed parts are completely detachable.

2. An airbag device for occupant at passenger's seat, which is disposed in an instrument panel portion of a vehicle in opposite to an occupant at passenger's seat, said airbag device comprising:

the airbag set forth in claim 1, the gas distributing portion opening toward a vehicle widthwise direction, the airbag inflating and expanding with the outside top face portion thereof being opposed to the occupant as a target to be protected; and an inflator for supplying gas to the gas introducing portion of the airbag.

* * * * *